US011575832B2

(12) United States Patent
Harada et al.

(10) Patent No.: US 11,575,832 B2
(45) Date of Patent: Feb. 7, 2023

(54) IMAGING DEVICE, CAMERA-MOUNTED DRONE, MODE CONTROL METHOD, AND PROGRAM

(71) Applicant: Sony Group Corporation, Tokyo (JP)

(72) Inventors: Takeshi Harada, Tokyo (JP); Ryunosuke Oda, Tokyo (JP)

(73) Assignee: Sony Group Corporation, Tokyo (JP)

( * ) Notice: Subject to any disclaimer, the term of this patent is extended or adjusted under 35 U.S.C. 154(b) by 287 days.

(21) Appl. No.: 16/625,199

(22) PCT Filed: May 31, 2018

(86) PCT No.: PCT/JP2018/020908
§ 371 (c)(1),
(2) Date: Dec. 20, 2019

(87) PCT Pub. No.: WO2019/008958
PCT Pub. Date: Jan. 10, 2019

(65) Prior Publication Data
US 2020/0145582 A1 May 7, 2020

(30) Foreign Application Priority Data

Jul. 5, 2017 (JP) .............................. JP2017-131675

(51) Int. Cl.
*H04N 5/232* (2006.01)
*B64C 39/02* (2006.01)
*B64D 47/08* (2006.01)

(52) U.S. Cl.
CPC ....... *H04N 5/23245* (2013.01); *B64C 39/024* (2013.01); *B64D 47/08* (2013.01);
(Continued)

(58) Field of Classification Search
CPC ............ H04N 5/23245; H04N 5/23203; B64C 39/024; B64C 2201/027; B64C 2201/127;
(Continued)

(56) References Cited

U.S. PATENT DOCUMENTS

| 2002/0038370 A1* | 3/2002 | Demoto | ............... H04L 12/5692 709/227 |
| 2006/0109349 A1* | 5/2006 | Takashima | ........... H04N 1/2183 348/207.1 |
| 2013/0318214 A1* | 11/2013 | Tebay | ..................... H04L 67/06 709/219 |

FOREIGN PATENT DOCUMENTS

| JP | 2006-027448 A | 2/2006 |
| JP | 2007043243 A | 2/2007 |

(Continued)

*Primary Examiner* — Sinh Tran
*Assistant Examiner* — Zhenzhen Wu
(74) *Attorney, Agent, or Firm* — Michael Best & Friedrich LLP

(57) ABSTRACT

There is realized an imaging device that monitors a communication status or the like, and executes switching processing from an MSC mode to a PTP mode in a case where a pre-defined condition is satisfied. There is provided a control unit configured to execute switching processing between a PTP communication mode applied with a PTP protocol, and an MSC mode, which is a communication mode according to a mass storage class (MSC). For example, in a case where MSC mode communication processing has not been executed for a specified time or more, a case where a movement indicating start of image capturing is detected, or the like, the control unit executes switching processing from the MSC mode to the PTP mode. After switching to the PTP mode, it is possible to execute imaging by inputting an image capturing control command from a host device.

20 Claims, 13 Drawing Sheets

(52) U.S. Cl.
CPC ... *H04N 5/23203* (2013.01); *B64C 2201/027* (2013.01); *B64C 2201/127* (2013.01)

(58) Field of Classification Search
CPC ........ B64C 2201/123; B64C 2201/141; B64C 2201/146; B64C 39/02; B64D 47/08; G03B 15/00; G03B 17/38; G03B 17/56
See application file for complete search history.

(56) References Cited

FOREIGN PATENT DOCUMENTS

| | | | | |
|---|---|---|---|---|
| JP | 2007-148802 A | | 6/2007 | |
| JP | 2007148802 A | * | 6/2007 | |
| JP | 2007-288265 A | | 11/2007 | |
| JP | 2007288265 A | * | 11/2007 | |
| JP | 2017-034444 A | | 2/2017 | |
| WO | WO-2005001701 A1 | * | 1/2005 | ........... G06F 13/385 |

* cited by examiner

FIG. 8

MODE SWITCHING DETERMINATION PROCESSING A

| | STEP S103 | STEP S104 | PROCESSING |
|---|---|---|---|
| | ELAPSED TIME (t) AFTER SWITCHING FROM PTP MODE (IMAGE CAPTURE MODE) TO MSC MODE (IMAGE TRANSFER MODE) | PRESENCE OR ABSENCE OF MSC MODE (IMAGE TRANSFER MODE) COMMUNICATION | |
| (a1) | t < Tth1 (S103=No) | — | IT IS DETERMINED AS WAITING FOR IMAGE TRANSFER START IN MSC MODE (IMAGE TRANSFER MODE), AND MSC MODE IS CONTINUED (S102) |
| (a2) | t ≥ Tth1 (S103=Yes) | THERE IS MSC MODE COMMUNICATION (IMAGE TRANSFER IS EXECUTED) (S104=Yes) | IT IS DETERMINED THAT IMAGE TRANSFER IN MSC MODE (IMAGE TRANSFER MODE) IS BEING EXECUTED, MSC MODE IS CONTINUED, AND PROCESS PROCEEDS TO STEP S105 (DETERMINATION PROCESSING B IS EXECUTED) |
| (a3) | | THERE IS NO MSC MODE COMMUNICATION (IMAGE TRANSFER IS NOT EXECUTED) (S104=No) | IT IS DETERMINED THAT IMAGE TRANSFER IN MSC MODE (IMAGE TRANSFER MODE) IS NOT EXECUTED, AND SWITCHING IS PERFORMED TO PTP MODE (IMAGE CAPTURE MODE) (S108) |

FIG. 9

MODE SWITCHING DETERMINATION PROCESSING B

| | STEP S106 | STEP S107 | PROCESSING |
|---|---|---|---|
| | PRESENCE OR ABSENCE OF MSC MODE (IMAGE TRANSFER MODE) COMMUNICATION | ELAPSED TIME (t) FROM MOST RECENT COMMUNICATION IN MSC MODE (IMAGE TRANSFER MODE) | |
| (b1) | THERE IS MSC MODE COMMUNICATION (IMAGE TRANSFER IS EXECUTED) (S106=Yes) | — | IT IS DETERMINED THAT IMAGE TRANSFER IS BEING EXECUTED IN MSC MODE (IMAGE TRANSFER MODE), AND MSC MODE IS CONTINUED (S105) |
| (b2) | THERE IS NO MSC MODE COMMUNICATION (IMAGE TRANSFER IS NOT EXECUTED) (S106=No) | $t < T_{th2}$ (S107=No) | IT IS DETERMINED THAT IMAGE TRANSFER IS BEING EXECUTED IN MSC MODE (IMAGE TRANSFER MODE), AND MSC MODE IS CONTINUED (S105) |
| (b3) | | $t \geq T_{th2}$ (S107=Yes) | IT IS DETERMINED THAT IMAGE TRANSFER IS ENDED IN MSC MODE (IMAGE TRANSFER MODE), AND SWITCHING IS PERFORMED TO PTP MODE (IMAGE CAPTURE MODE) (S108) |

FIG. 12

EXAMPLE OF MOVEMENT INDICATING START OF IMAGING

| EXAMPLE OF MOVEMENT INDICATING START OF IMAGING | REASON |
|---|---|
| (1) TURNING | TURNING IS MOVEMENT THAT IS OFTEN EXECUTED WHEN IMAGING DIRECTION IS CHANGED, AND IT IS DETERMINED AS START OF IMAGING, TO SWITCH TO PTP MODE (IMAGE CAPTURE MODE) |
| (2) REPEATED ASCENT AND DESCENT AT FIXED POSITION | MOVEMENT OF ONLY ASCENT OR DESCENT IS DETERMINED AS MIDDLE OF MOVEMENT, WHILE REPEATED ASCENT AND DESCENT AT FIXED POSITION IS DETERMINED AS START OF IMAGING, TO SWITCH TO PTP MODE (IMAGE CAPTURE MODE) |

FIG. 13

MODE SWITCHING DETERMINATION PROCESSING C

| | STEP S202<br>PRESENCE OR ABSENCE OF MSC MODE (IMAGE TRANSFER MODE) COMMUNICATION | STEP S203<br>MOVEMENT INDICATING START OF IMAGING IS DETECTED | PROCESSING |
|---|---|---|---|
| (c1) | THERE IS MSC MODE COMMUNICATION (IMAGE TRANSFER IS EXECUTED) (S202=Yes) | — | IT IS DETERMINED THAT IMAGE TRANSFER IS BEING EXECUTED IN MSC MODE (IMAGE TRANSFER MODE), AND MSC MODE IS CONTINUED (S201) |
| (c2) | THERE IS NO MSC MODE COMMUNICATION (IMAGE TRANSFER IS NOT EXECUTED) (S202=No) | MOVEMENT OF START OF IMAGING IS DETECTED (S203=Yes) | IT IS DETERMINED THAT IMAGING IS TO BE STARTED, AND SWITCHING IS PERFORMED TO PTP MODE (IMAGE CAPTURE MODE) (S204) |
| (c3) | | NO MOVEMENT OF START OF IMAGING IS DETECTED (S203=No) | IT IS DETERMINED THAT IMAGING IS NOT TO BE STARTED, AND MSC MODE IS CONTINUED (S201) |

IMAGING DEVICE, CAMERA-MOUNTED DRONE, MODE CONTROL METHOD, AND PROGRAM

TECHNICAL FIELD

The present disclosure relates to an imaging device, a camera-mounted drone, a mode control method, and a program. More specifically, the present disclosure relates to an imaging device that switches between a capture mode and a transfer mode on an image, a camera-mounted drone, a mode control method, and a program.

BACKGROUND ART

In recent years, the use of drones, which are small aircrafts that perform flight by remote control or autonomous flight based on a GPS or the like, has increased rapidly.

For example, a camera is mounted to a drone and used for processing of capturing an image of a landscape on the ground from the sky, or the like.

Furthermore, aerial images using drones are also used recently in terrain confirmation processing, survey processing, construction sites, and the like.

The drone includes, for example, a type that performs flight control according to instructions from a remote controller on the ground, and a type that autonomously flies by receiving position information of a GPS or the like.

In any case, a controller (control unit) of a drone main body receives an instruction signal from the remote controller or a GPS signal to fly.

Control of start and stop processing of imaging, imaging setting, and the like of the camera mounted on the drone is executed with a command outputted to the camera side from the controller of the drone main body, for example.

For example, the controller of the drone main body receives an instruction from the remote controller on the ground, and the controller of the drone main body outputs an imaging control command to the camera on the basis of the instruction.

Furthermore, in the case of an autonomous flight drone, an imaging control command is outputted to the camera in accordance with a program stored in a memory inside the controller of the drone main body.

For example, there is setting such as outputting an imaging start command to the camera in a case where an imaging position recorded in the program matches the current position based on the GPS signal.

The controller of the drone main body and the camera have, for example, a universal serial bus (USB) connection configuration.

For example, the controller of the drone main body outputs various imaging control commands to the camera in accordance with a picture transfer protocol (PTP), which is a USB communication standard (communication protocol).

Moreover, the controller of the drone main body performs wireless communication with a communication device used by a user who is a drone manager on the ground. For example, the controller of the drone main body notifies the communication device used by the user of a drone status and the like.

In order for the user to obtain a captured image of the camera mounted to the drone, a general method is to remove a memory card such as an SD card, which is image storage means of the camera, and mount to a PC or the like for checking, after the drone returns to a base station on the ground after imaging.

Alternatively, processing is performed in which the camera is removed from the drone, the camera is connected to a host device such as a PC, and the host device reads an image stored in a storage unit of the camera.

However, in any case, the above processing is for acquiring and checking a captured image after the drone returns to the ground, and it is not possible to check whether or not a target image has been captured at the time of image capturing, for example.

In a case where the captured image is acquired and checked after the drone returns to the ground as described above, there is a problem that re-imaging is required in case of failure in capturing a target image, resulting in time loss and cost increase.

It is technically possible to transfer images captured by the camera from the camera to the drone-main-body controller, and further transmit from the drone-main-body controller to a communication device of a PC and the like on the ground.

However, in a state where imaging control by the picture transfer protocol (PTP) communication is performed, which is a USB communication standard described above, between the drone-main-body controller and the camera, when image transfer using the PTP communication protocol is to be executed, a time for image transfer from the camera to the drone-main-body controller becomes longer, and the imaging control command cannot be issued during that time, which causes a problem that imaging control is hindered.

For example, using a mass storage class (MSC), which is a USB data transfer standard, enables high speed transfer of images from the camera to the drone-main-body controller.

For example, Patent Document 1 (Japanese Patent Laid-Open No. 2007-148802) discloses a protocol switching configuration from a PTP that is a communication protocol set by default to a mass storage class (MSC).

The configuration described in Patent Document 1 is a configuration of connecting a PC and a camera, transmitting a predetermined message from the PC side to the camera, and switching the protocol.

However, the configuration described in Patent Document 1 is only for switching from the PTP to the mass storage class (MSC), and switching from the mass storage class (MSC) to the PTP is not described.

Furthermore, in order to realize the configuration described in Patent Document 1, a drone-main-body controller side needs to send a message to switch the protocol to the camera, which requires change of a specification (program) on the drone-main-body controller side.

CITATION LIST

Patent Document

Patent Document 1: Japanese Patent Application Laid-Open No. 2007-148802

SUMMARY OF THE INVENTION

Problems to be Solved by the Invention

The present disclosure is made in view of the above-mentioned problem, for example, and an object is to provide an imaging device, a camera-mounted drone, a mode control method, and a program in which a camera autonomously switches between a capture mode and a transfer mode on an image without change of a specification (program) on a drone-main-body controller side, and efficient switching between image transfer and image capturing is enabled.

In one embodiment of the present disclosure, an object is to provide an imaging device, a camera-mounted drone, a mode control method, and a program that enable camera to autonomously execute switching from a mass storage class (MSC) to a PTP.

Solutions to Problems

A first aspect of the present disclosure is an imaging device having a control unit configured to execute switching processing on a communication mode between a PTP mode, which is a communication mode according to a picture transfer protocol (PTP), and an MSC mode, which is a communication mode according to a mass storage class (MSC), in which the control unit verifies a communication status in the MSC mode, and executes switching processing from the MSC mode to the PTP mode in a case where it is determined that a pre-defined mode switching condition is satisfied.

Moreover, a second aspect of the present disclosure is a camera-mounted drone having:

a drone-main-body control device configured to execute flight control of a drone and imaging control for a camera connected via a communication unit; and a camera configured to execute image capturing in response to an input command from the drone-main-body control device, in which the camera has a camera control unit configured to execute switching processing on a communication mode between a PTP mode, which is a communication mode according to a picture transfer protocol (PTP), and an MSC mode, which is a communication mode according to a mass storage class (MSC), and the camera control unit verifies a communication status in the MSC mode, and executes switching processing from the MSC mode to the PTP mode in a case where it is determined that a pre-defined mode switching condition is satisfied.

Moreover, a third aspect of the present disclosure is a mode control method to be executed in an imaging device, in which the imaging device has a control unit configured to execute switching processing on a communication mode between a PTP mode, which is a communication mode according to a picture transfer protocol (PTP), and an MSC mode, which is a communication mode according to a mass storage class (MSC), and the control unit verifies a communication status in the MSC mode, and executes switching processing from the MSC mode to the PTP mode in a case where it is determined that a pre-defined mode switching condition is satisfied.

Moreover, a fourth aspect of the present disclosure is a mode control method to be executed in a camera-mounted drone, in which the camera-mounted drone has:

a drone-main-body control device configured to execute flight control of a drone and imaging control for a camera connected via a communication unit; and a camera configured to execute image capturing in response to an input command from the drone-main-body control device, and the camera verifies a communication status in an MSC mode, and executes switching processing from the MSC mode to a PTP mode in a case where it is determined that a pre-defined mode switching condition is satisfied.

Moreover, a fifth aspect of the present disclosure is a program for executing mode control processing in an imaging device, in which the imaging device has a control unit configured to execute switching processing on a communication mode between a PTP mode, which is a communication mode according to a picture transfer protocol (PTP), and an MSC mode, which is a communication mode according to a mass storage class (MSC), and the program causes the control unit to execute processing for verifying a communication status in the MSC mode, and switching processing from the MSC mode to the PTP mode in a case where it is determined that a pre-defined mode switching condition is satisfied.

Note that the program of the present disclosure is, for example, a program that can be provided by a storage medium or communication medium that provides various program codes in a computer-readable format, to an information processing apparatus or a computer system capable of executing the program codes. By providing such a program in a computer-readable format, processing corresponding to the program is realized on the information processing apparatus or the computer system.

Still other objects, features, and advantages of the present disclosure will become apparent from the more detailed description based on the embodiments of the present disclosure as described later and the attached drawings. Note that a system in this specification is a logical set configuration of a plurality of devices, and is not limited to one in which a device of each configuration is in a same casing.

Effects of the Invention

According to a configuration of an embodiment of the present disclosure, there is realized an imaging device that monitors a communication status or the like, and executes switching processing from an MSC mode to a PTP mode in a case where a pre-defined condition is satisfied.

Specifically, there is provided a control unit configured to execute switching processing between for example, a PTP communication mode applied with the PTP protocol, and an MSC mode, which is a communication mode according to a mass storage class (MSC). For example, in a case where MSC mode communication processing has not been executed for a specified time or more, a case where a movement indicating start of image capturing is detected, or the like, the control unit executes switching processing from the MSC mode to the PTP mode. After switching to the PTP mode, it is possible to execute imaging by inputting an image capturing control command from a host device.

This configuration realizes an imaging device that monitors a communication status or the like and executes switching processing from the MSC mode to the PTP mode in a case where a pre-defined condition is satisfied.

Note that the effects described in this specification are merely examples and are not limited, and additional effects may be present.

BRIEF DESCRIPTION OF DRAWINGS

FIG. 8 is a view for explaining a correspondence between a determination form and processing to be executed in mode switching determination processing A.

FIG. 9 is a view for explaining a correspondence between a determination form and processing to be executed in mode switching determination processing B.

FIG. 12 is a view for explaining an example of movement indicating start of imaging, applied to mode switching determination processing.

FIG. 13 is a view for explaining a correspondence between a determination form and processing to be executed in mode switching determination processing C.

MODE FOR CARRYING OUT THE INVENTION

Hereinafter, details of an imaging device, a camera-mounted drone, a mode control method, and a program of the present disclosure will be described with reference to the drawings. Note that the description will be made in accordance with the following items.

1. About configuration example of system to which processing of present disclosure can be applied
2. About configuration example of drone-main-body control device and camera
3. About specific example of switching processing between image capture mode and image transfer mode
4. About processing example for detecting movement indicating start of imaging to execute mode switching
5. Summary of configuration of present disclosure

[1. About Configuration Example of System to which Processing of Present Disclosure can be Applied]

Figure 1:
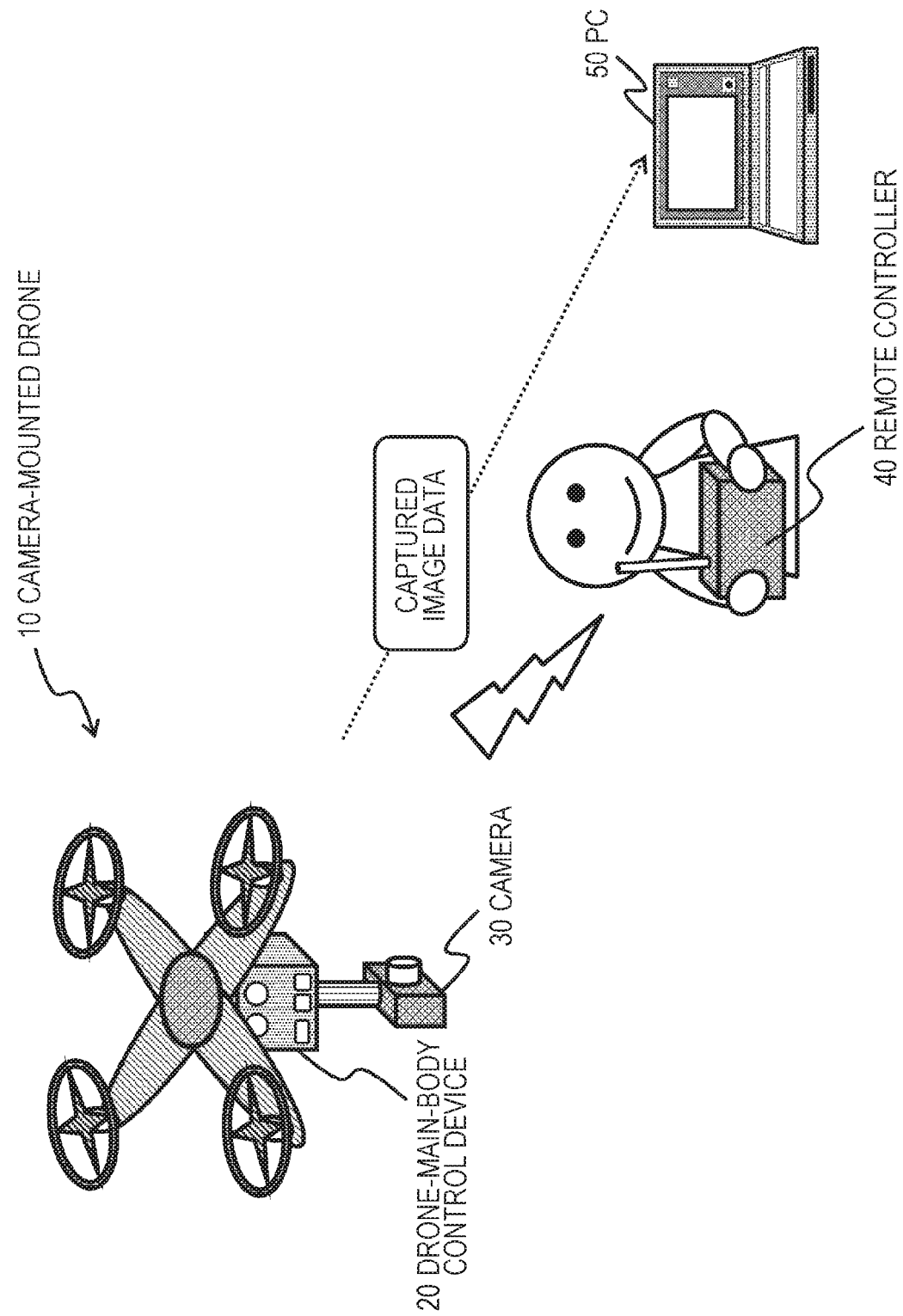
FIG. 1 is a view for explaining an example of a flight of a camera-mounted drone and an image capturing processing.

First, with reference to FIG. 1 and following, a description is given to a configuration example of a system to which processing of the present disclosure can be applied.

FIG. 1 is a view showing a configuration example of a system to which processing of the present disclosure can be applied.

FIG. 1 shows a camera-mounted drone 10. The camera-mounted drone 10 includes a drone-main-body control device (controller) 20 and a camera 30.

The drone-main-body control device 20 and the camera 30 are connected by a universal serial bus (USB).

The drone-main-body control device (controller) 20 outputs various imaging control commands to the camera 30, such as start of capturing, stop of capturing, and capturing settings of an image, in accordance with a picture transfer protocol (PTP), which is a USB communication standard (communication protocol).

The drone-main-body control device 20 performs wireless communication with a remote controller 40 used by a user who is a drone manager on the ground, and flies in accordance with a command inputted from the remote controller 40.

A captured image of the camera 30 is transferred from the camera 30 to the drone-main-body control device 20, and further transmitted from the drone-main-body control device 20 to a PC 50 on the ground.

The camera 30 of the present disclosure autonomously switches between a capture mode and a transfer mode on an image.

Specifically, in a case where the camera 30 is set to the image capture mode, imaging processing is performed by inputting various imaging control commands such as start of capturing, stop of capturing, and capturing settings of an image, from the drone-main-body control device (controller) 20 in accordance with the picture transfer protocol (PTP), which is a USB communication standard (communication protocol) described above.

Whereas, when the camera 30 is set to the image transfer mode, the camera 30 uses a mass storage class (MSC), which is a USB data transfer standard, for the drone-main-body control device 20, to transfer a captured image from the camera 30 to the drone-main-body control device 20 at a high speed.

The drone-main-body control device 20 further transmits the captured image data inputted from the camera 30, to the PC 50.

A series of these processes enables the user on the ground to immediately check the captured image of the camera 30 in the sky.

The system shown in FIG. 1 is a system in which the camera-mounted drone 10 flies in accordance with control information transmitted by the remote controller 40 used by the user on the ground. However, a configuration is also possible in which the camera-mounted drone 10 receives position information of a GPS or the like and autonomously flies without execution of such flight control with the remote controller 40.

Figure 2:
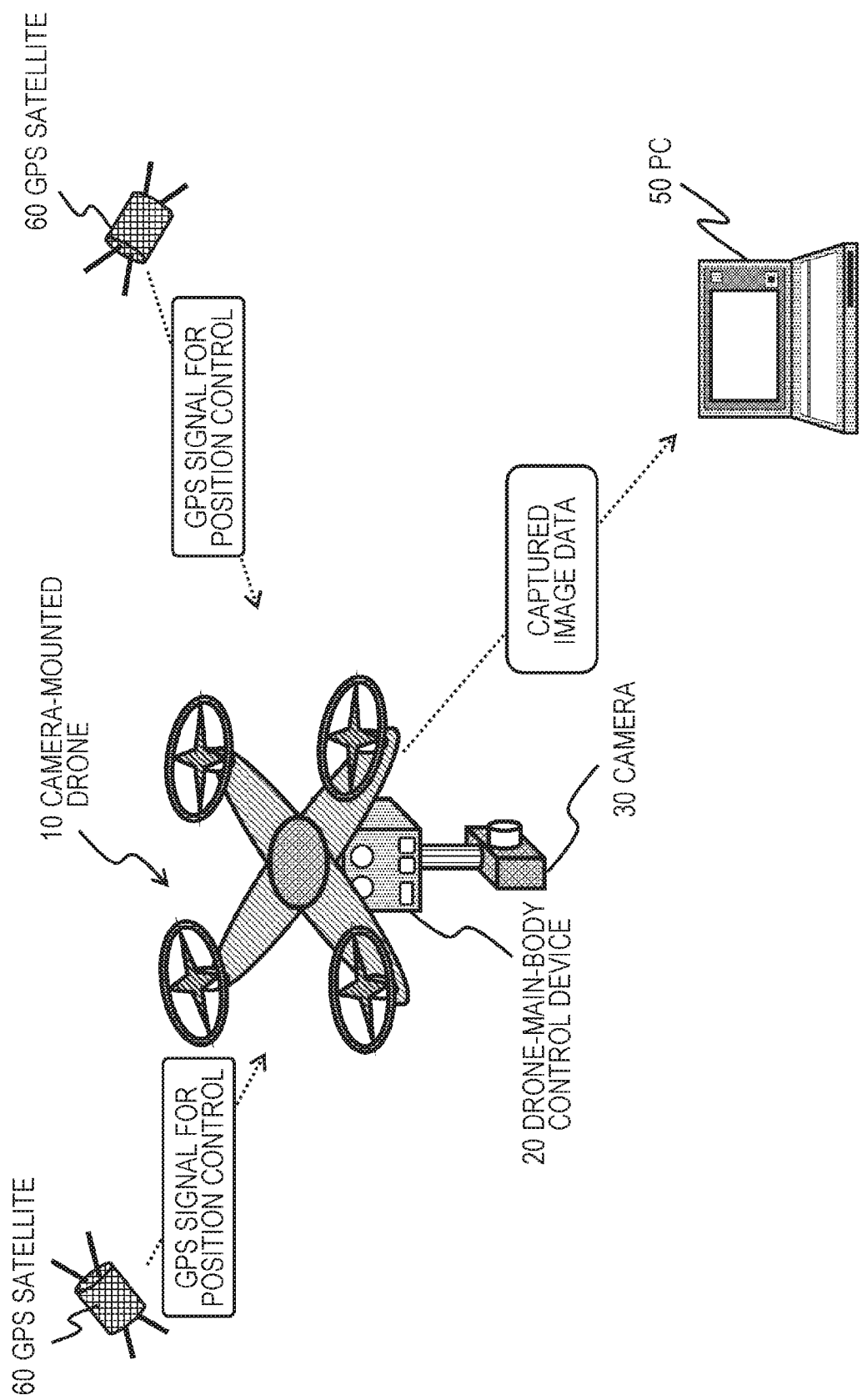
FIG. 2 is a view for explaining an example of a flight of the camera-mounted drone and an image capturing processing.

With reference to FIG. 2, a description is given to a system configuration of an autonomous flight drone to which processing of the present disclosure can be applied.

FIG. 2 shows the camera-mounted drone 10, similarly to FIG. 1. The camera-mounted drone 10 includes a drone-main-body control device (controller) 20 and a camera 30.

The drone-main-body control device 20 and the camera 30 are connected by a universal serial bus (USB).

The drone-main-body control device (controller) 20 outputs various imaging control commands to the camera 30, such as start of capturing, stop of capturing, and capturing settings of an image, in accordance with a picture transfer protocol (PTP), which is a USB communication standard (communication protocol).

In the configuration shown in FIG. 2, the drone-main-body control device 20 receives a GPS signal from a GPS satellite 60, checks an own position, and flies in accordance with a flight route according to a program stored in a memory in the drone-main-body control device 20.

Moreover, when reaching a pre-defined position, an imaging start command is outputted to the camera 30 to start imaging processing. Moreover, various images are captured in accordance with the program, and an imaging end command is outputted to the camera 30 when predetermined imaging processing is completed.

Also in this configuration, a captured image of the camera 30 is transferred from the camera 30 to the drone-main-body control device 20, and further transmitted from the drone-main-body control device 20 to a PC 50 on the ground.

Also in this configuration, the camera 30 of the present disclosure autonomously switches between the capture mode and the transfer mode on an image. In other words, in a case where the camera 30 is set to the image capture mode, imaging processing is performed by inputting various imaging control commands such as start of capturing, stop of capturing, and capturing settings of an image, from the drone-main-body control device (controller) 20 in accordance with the picture transfer protocol (PTP), which is a USB communication standard (communication protocol) described above.

Whereas, when the camera 30 is set to the image transfer mode, the camera 30 uses the mass storage class (MSC), which is a USB data transfer standard, for the drone-main-body control device 20, to transfer a captured image from the camera 30 to the drone-main-body control device 20 at a high speed.

The drone-main-body control device 20 further transmits the captured image data inputted from the camera 30, to the PC 50.

A series of these processes enables the user on the ground to immediately check the captured image of the camera 30 in the sky.

Figure 3:
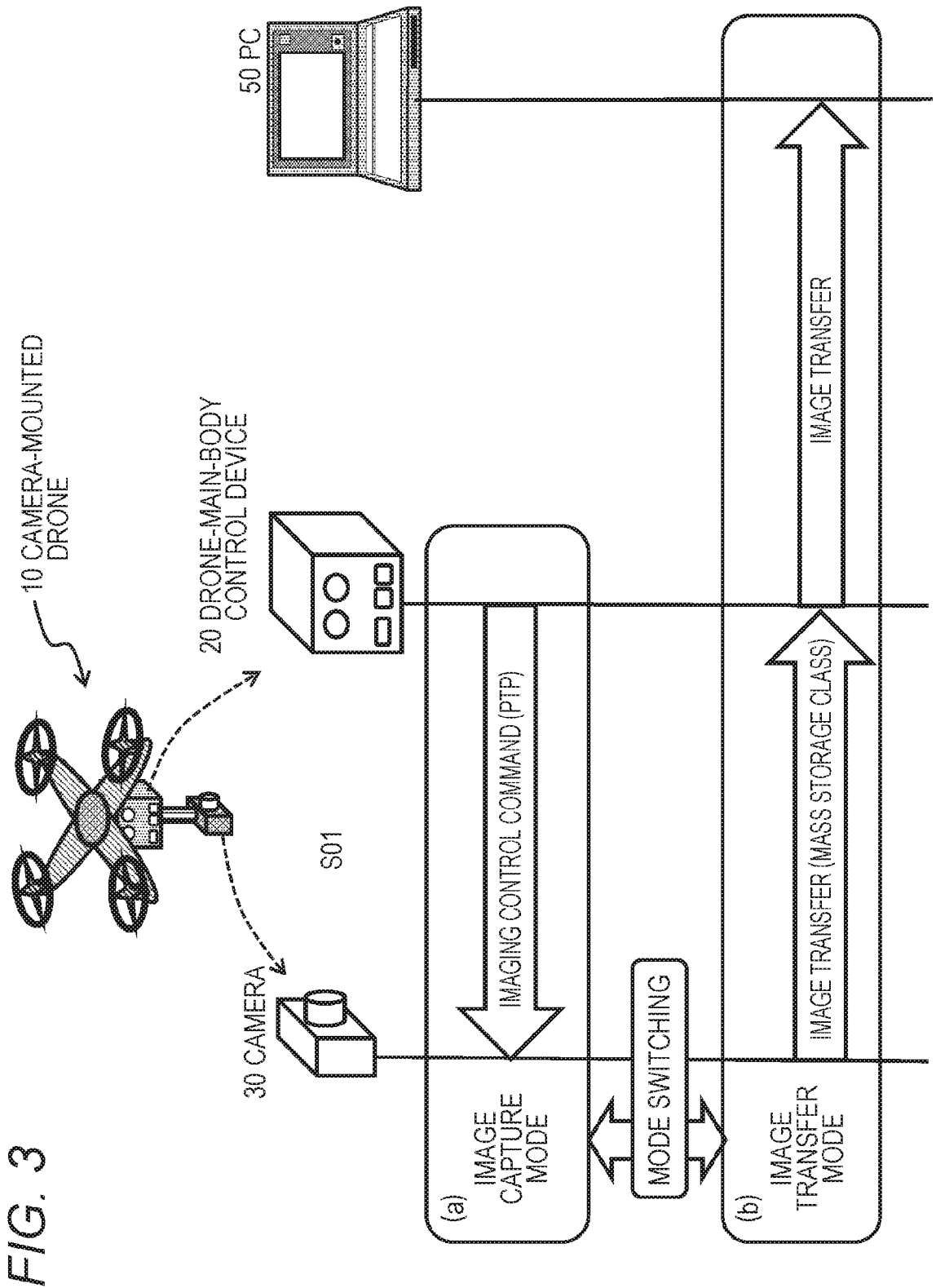
FIG. 3 is a view for explaining an example of image capturing of the camera-mounted drone and a transfer sequence.

With reference to FIG. 3, a description is given to an example of communication processing between individual devices in the system shown in FIGS. 1 and 2.

FIG. 3 shows the camera 30 and the drone-main-body control device 20 included in the camera-mounted drone 10 that flies in the sky, and the PC 20 on the ground side.

As described with reference to FIGS. 1 and 2, the camera 30 autonomously switches between the capture mode and the transfer mode on an image.

The communication processing shown in FIG. 3(*a*) is an example of communication processing in a case where the camera 30 is set to the image capture mode.

In a case where the camera 30 is set to the image capture mode, imaging processing is performed by inputting various imaging control commands such as start of capturing, stop of capturing, and capturing settings of an image, from the drone-main-body control device (controller) 20 in accordance with the picture transfer protocol (PTP), which is a USB communication standard (communication protocol) described above.

The communication processing shown in FIG. 3(*b*) is an example of communication processing in a case where the camera 30 is set to the image transfer mode.

When the camera 30 is set to the image transfer mode, the camera 30 uses the mass storage class (MSC), which is a USB data transfer standard, for the drone-main-body control device 20, to transfer a captured image from the camera 30 to the drone-main-body control device 20 at a high speed.

The drone-main-body control device 20 further transmits the captured image data inputted from the camera 30, to the PC 50.

A series of these processes enables the user on the ground to immediately check the captured image of the camera 30 in the sky.

Note that the switching processing between the capture mode and the transfer mode on an image with the camera 30 is executed by the camera 30 itself on the basis of a moving speed of the camera-mounted drone 10, an image capturing interval, and the like.

A specific example of this mode switching processing will be described in detail later.

[2. About Configuration Example of Drone-Main-Body Control Device and Camera]

Next, a configuration example of the drone-main-body control device 20 and the camera 30 included in the camera-mounted drone 10 will be described.

Figure 4:
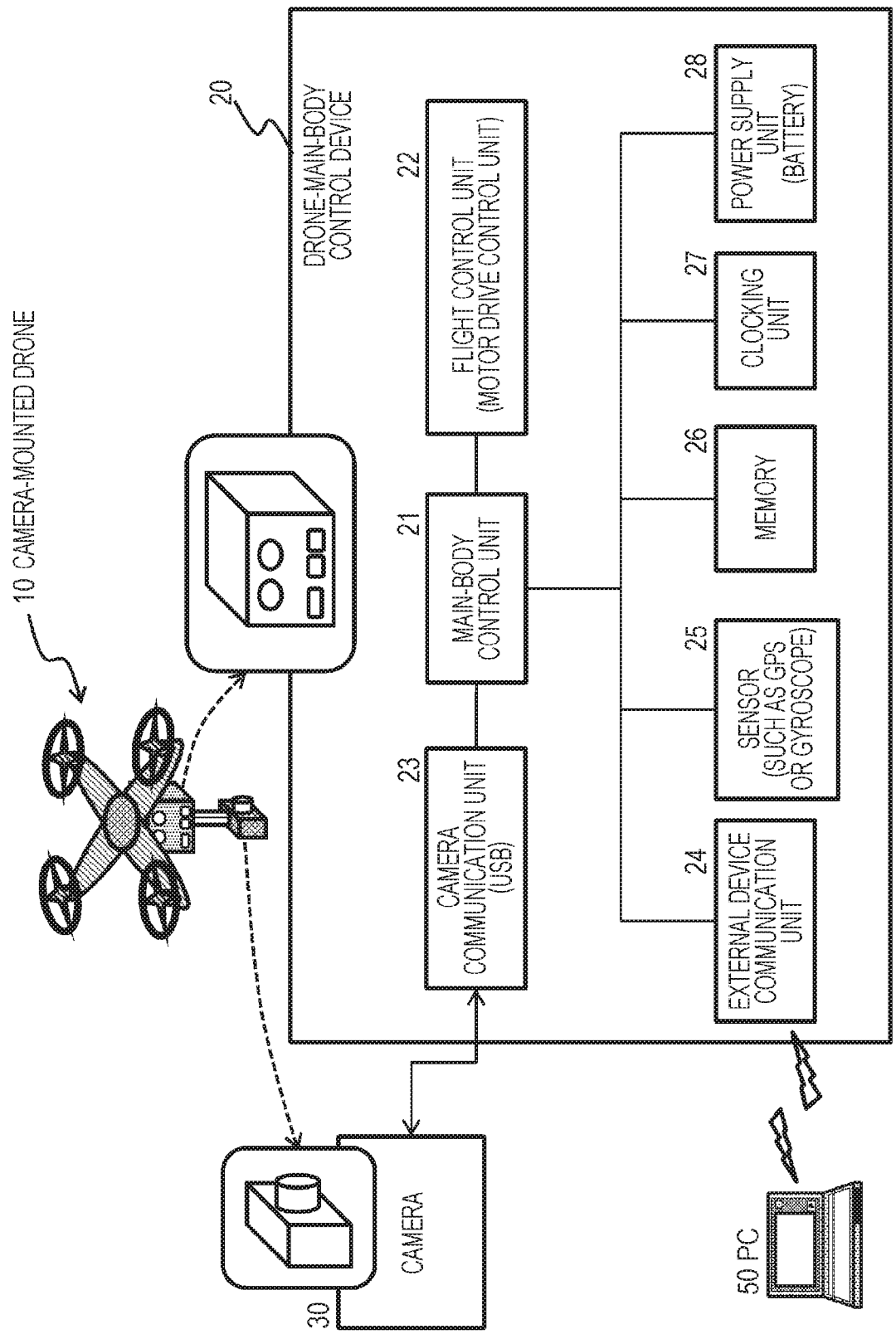
FIG. 4 is a diagram for explaining a configuration example of a drone-main-body control device.

FIG. 4 is a block diagram showing a configuration example of the drone-main-body control device 20 included in the camera-mounted drone 10.

As shown in FIG. 4, the drone-main-body control device 20 includes a main-body control unit 21, a flight control unit 22, a camera communication unit 23, an external device communication unit 24, a sensor (GPS, gyroscope, and the like) 25, a memory 26, and a clocking unit 27, and a power supply unit (battery) 28.

The main-body control unit 21 executes overall control of the drone main body. For example, control for performing flight according to a preset flight program and imaging processing according to an imaging program is executed.

The program is stored in the memory 26. The main-body control unit 21 has a program execution function such as a CPU, and reads and executes the program stored in the memory 26.

Specifically, the flight control unit 22 performs, for example, motor drive control of a propeller. Rotational speeds and the like of a plurality of propellers are controlled such that flight according to the program is performed in accordance with a command from the main-body control unit 21.

The camera communication unit 23 executes communication with the camera 30.

In this example, the camera communication unit 23 is configured as a communication unit that performs USB communication according to the universal serial bus (USB) standard.

Communication according to each protocol of the PTP and the mass storage class (MSC) described above with reference to FIG. 3 is executed.

In a case where the camera 30 is set to the image capture mode, various imaging control commands such as start of capturing, stop of capturing, and capturing settings of an image are outputted to the camera 30 in accordance with the picture transfer protocol (PTP), which is one of the USB data communication protocols.

Whereas, when the camera 30 is set to the image transfer mode, from the camera 30, a captured image is inputted from the camera 30 with use of the mass storage class (MSC), which is a USB data transfer standard.

The external device communication unit 24 communicates with, for example, a PC, a remote controller, and the like on the ground.

As described above with reference to FIG. 1, in a case of performing a maneuver with the remote controller, flight control is performed by receiving maneuver operation information and the like by the user from the remote controller.

Furthermore, as described above with reference to FIG. 2, in a case of performing autonomous flight using a GPS signal and the like, flight is performed in accordance with a programmed flight path stored in the memory 26 while checking an own position with the GPS signal received by the sensor (GPS, gyroscope, and the like) 25, without receiving maneuver information from the remote controller.

Note that, in addition to the GPS, the sensor 25 includes a various own-position estimation device and movement estimation device, such as a gyroscope and a camera.

The external device communication unit 24 further performs processing for transmitting a captured image of the camera 30 to the PC on the ground.

As described above, in a case where the camera 30 is set to the image transfer mode, from the camera 30, a captured image is inputted to the drone-main-body control device 20 from the camera 30 with use of the mass storage class (MSC), which is a USB data transfer standard.

The drone-main-body control device 20 transmits the inputted image from the camera 30 to the PC or the like on the ground via the external device communication unit 24.

Note that the setting may be such that the captured image inputted from the camera 30 is temporarily stored in the memory 26, and thereafter, the image read from the memory 26 is transmitted to the PC or the like on the ground via the external device communication unit 24.

The external device communication unit 24 further performs processing and the like for transmitting a flight state to a management device such as a base center.

The memory 26 is used as a storage area for a program executed by the main-body control unit 21 and parameters for various kinds of processing, a work area for data processing executed by the main-body control unit 21, and the like.

The clocking unit 27 has a clock function and a timer function for acquiring the current time, performing time measurement processing, and the like.

The power supply unit (battery) 28 supplies power to each configuration unit of the drone-main-body control device 20.

Next, a configuration example of the camera 30 will be described with reference to FIG. 5.

Figure 5:
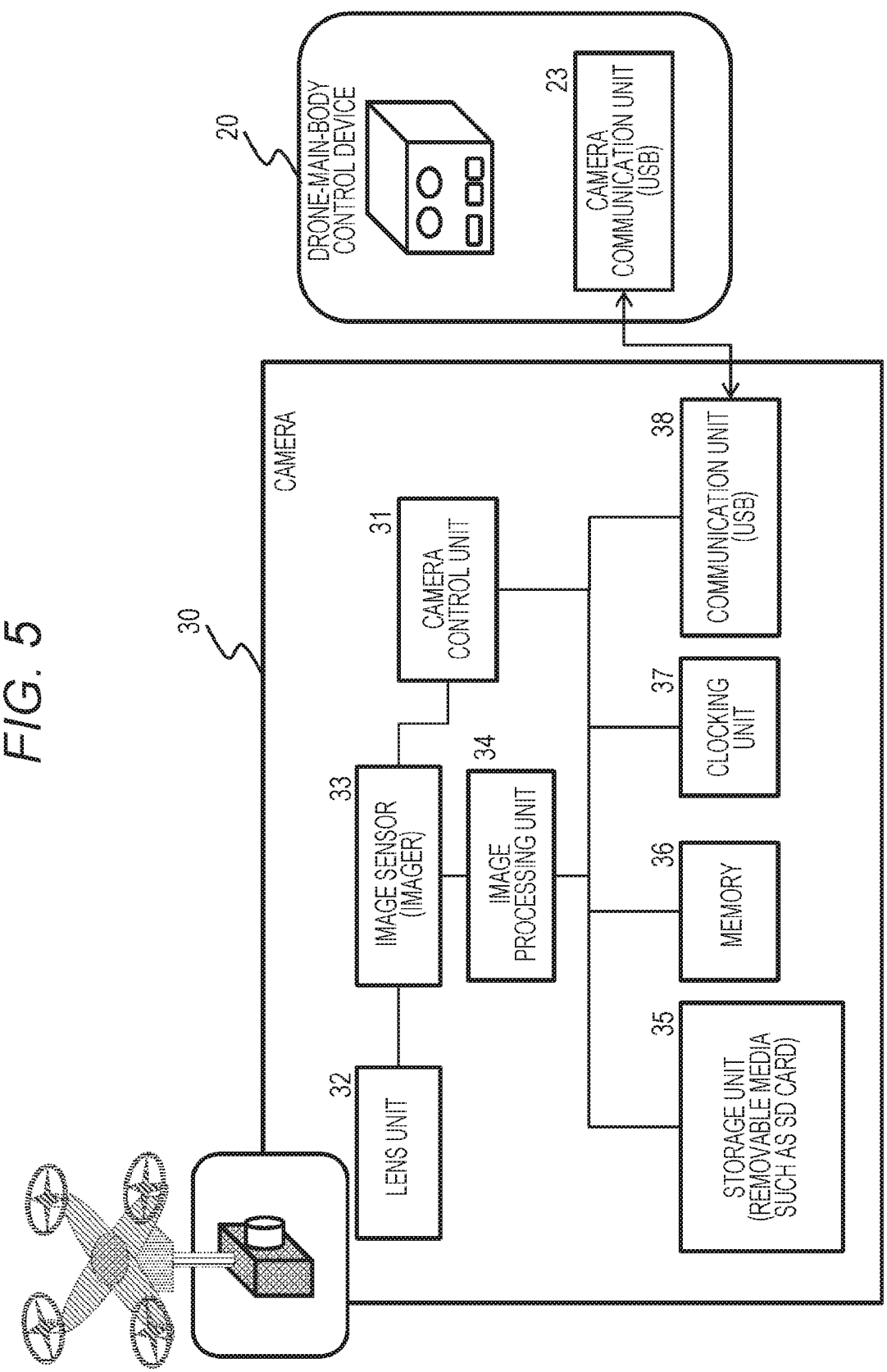
FIG. 5 is a diagram for explaining a configuration example of a camera.

As shown in FIG. 5, the camera 30 includes a camera control unit 31, a lens unit 32, an image sensor (imager) 33, an image processing unit 34, a storage unit 35, a memory 36, a clocking unit 37, and a communication unit 38.

The camera control unit 31 performs overall control of processing executed by the camera 30. For example, a CPU or the like for executing a program stored in the memory 35 is provided, and imaging control is performed. Moreover, communication control with the drone-main-body control device 20 is also performed.

Moreover, various states of the camera 30 are detected, and in accordance with the state, the mode is switched, in other words, the image capture mode and the image transfer mode are switched. Furthermore, PTP communication and mass storage class (MSC) communication are switched in accordance with each mode.

Details of these mode change processes will be described later.

The lens unit 32 and the image sensor (imager) 33 are configuration to capture an image.

The lens unit 32 includes a focus lens, a zoom lens, and the like.

The image sensor (imager) 33 includes a CMOS image sensor, a CCD, or the like.

Image data digitized by the image sensor (imager) 33 is inputted to the image processing unit 34.

The image processing unit 34 executes general image processing such as white balance adjustment or image compression processing. For example, a compressed image in JPEG or MPEG format is generated, and stored in the storage unit 35.

The storage unit 35 includes a flash memory and the like, such as an SD card, for example.

Note that, after the camera 30 is switched from the image capture mode to the image transfer mode, the image stored in the storage unit 35 is outputted toward the drone-main-body control device 20 via the communication unit 37, under the control of the control unit 31. This processing is performed in accordance with the mass storage class (MSC), which is a USB data transfer standard.

The camera 30 has no operation unit, and various types of imaging control, such as start and stop of imaging and zoom setting, are executed in accordance with an imaging control command inputted from the drone-main-body control device 20 via the communication unit 38.

As described above, this control command is transmitted and received between the camera communication unit 23 of the drone-main-body control device 20 and the communication unit 38 of the camera 30, in accordance with the PTP, which is one of the USB communication standards.

The memory 36 is used as a storage area for a program executed by the camera control unit 31 and parameters for various kinds of processing, a work area for data processing executed by the camera control unit 31, and the like.

The clocking unit 37 has a clock function and a timer function for acquiring the current time, performing time measurement processing, and the like.

The communication unit 38 is connected to the camera communication unit 23 of the drone-main-body control device 20, and inputs imaging control information and the like such as an imaging start command from the drone-main-body control device 20 in accordance with the PTP of the USB communication standard, in a case where the camera 30 is set to the image capture mode.

Furthermore, when the camera 30 is set to the image transfer mode, a captured image is outputted to the drone-main-body control device 20 in accordance with the mass storage class (MSC) of the USB communication standard.

[3. About Specific Example of Switching Processing Between Image Capture Mode and Image Transfer Mode]

Next, a specific example of switching processing between the image capture mode and the image transfer mode will be described.

As described above, the camera 30 mounted to the camera-mounted drone 10 autonomously switches between the capture mode and the transfer mode on an image.

Figure 6:
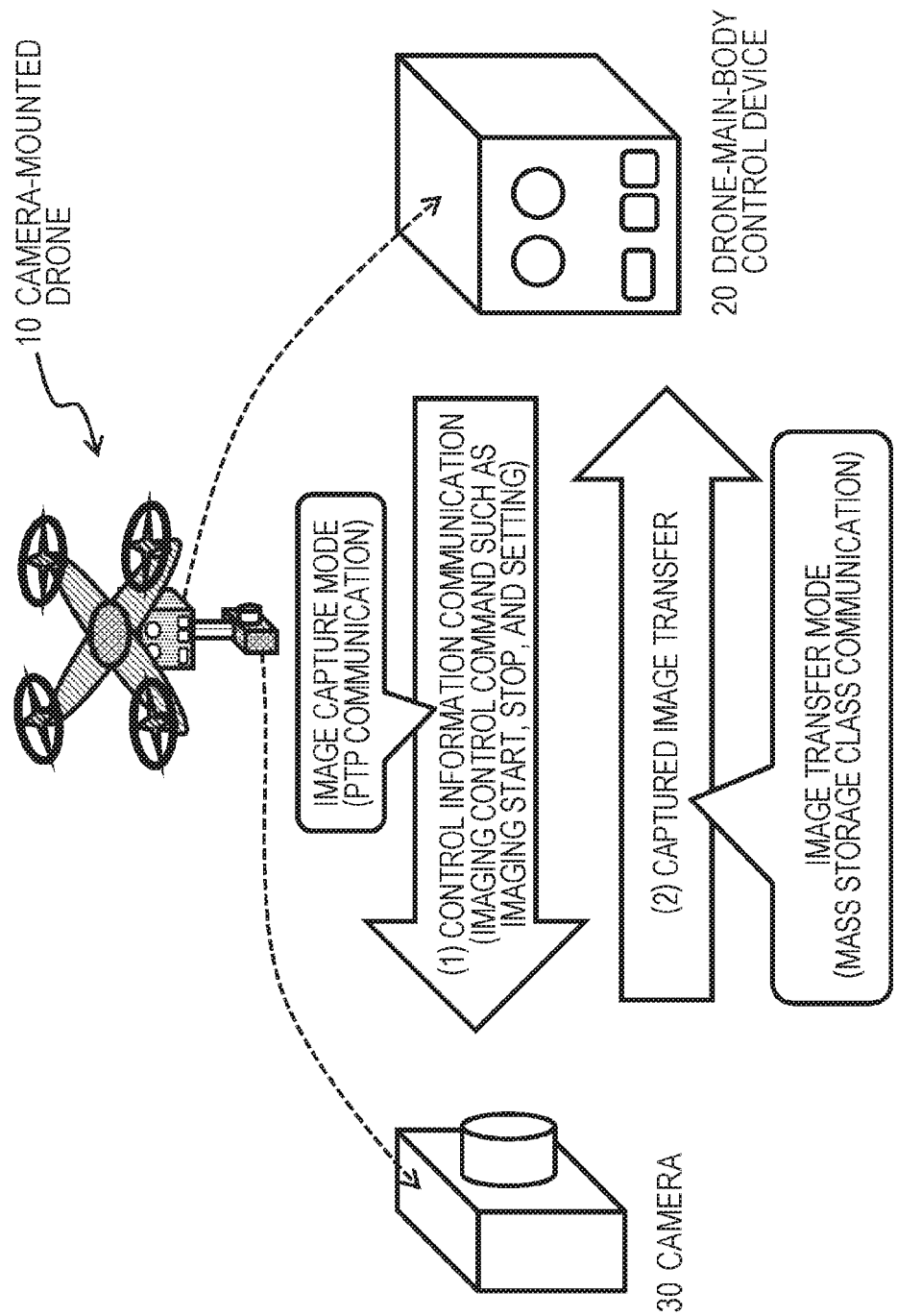
FIG. 6 is a view for explaining an example of communication processing between the drone-main-body control device and the camera.

In the image capture mode, as shown in FIG. 6(1), imaging processing is performed by inputting various imaging control commands such as start of capturing, stop of capturing, and capturing settings of an image, from the drone-main-body control device (controller) 20 in accordance with the PTP of the USB communication standard.

In the image transfer mode, as shown in FIG. 6(2), the camera 30 uses the mass storage class (MSC), which is a USB data transfer standard, for the drone-main-body control device 20, to transfer a captured image from the camera 30 to the drone-main-body control device 20 at a high speed.

The drone-main-body control device 20 further transmits the captured image data inputted from the camera 30, to the PC 50.

A series of these processes enables the user on the ground to immediately check the captured image of the camera 30 in the sky.

In the image capture mode, the communication protocol between the drone-main-body control device 20 and the camera 30 is set to the PTP, and imaging control of the camera 30 can be performed by transmitting various imaging control commands such as imaging execution, imaging stop, and focus and zoom settings from the drone-main-body control device 20 to the camera 30.

However, when image transfer using the PTP communication protocol is to be executed while the drone-main-body control device 20 and the camera 30 are performing imaging control by PTP communication, a time for image transfer from the camera 30 to the drone-main-body control device 20 becomes longer, and the imaging control command cannot be issued during that time, which causes a problem that imaging control is hindered.

Therefore, images can be transferred at a high speed by switching the communication protocol between the drone-main-body control device 20 and the camera 30 from the PTP to the mass storage class (MSC) at the start of image transfer, and transferring images from the camera 30 to the drone-main-body control device 20 in accordance with the protocol according to the mass storage class (MSC)

As a method of switching the communication protocol from the PTP to the mass storage class (MSC), for example, there is a method of notifying of a switching message using a PTP command, from the drone-main-body control device 20, which is a host device, to the camera 30, which is a slave device.

However, the command for switching from the mass storage class (MSC) to the PTP is not defined in the mass storage class (MSC) protocol.

Therefore, there is a problem that it is not possible to switch to the PTP protocol by the message notification in a case where communication according to the mass storage class (MSC) protocol is executed between the drone-main-body control device 20 and the camera 30.

For example, in a case of configuration in which a PC and a camera that can be directly operated by the user are connected, processing is also possible in which the user directly changes settings via an UI of the PC or the camera. However, as described with reference to FIG. 1 and FIG. 2, the user on the ground cannot directly operate the drone-main-body control device 20 and the camera 30, which are components of the camera-mounted drone 10 that flies in the sky.

Therefore, in order to switch the communication protocol between these devices from the mass storage class (MSC) to the PTP, some special countermeasure is required.

In the configuration of the present disclosure, the camera 30 verifies a communication status between the drone-main-body control device 20 and a movement of the camera 30, in a situation where communication is performed in accordance with a protocol corresponding to the mass storage class (MSC), between the camera 30 and the drone-main-body control device 20, which is a host device.

Moreover, in a case where the communication status with the drone-main-body control device 20 and a movement of the camera 30 satisfy a pre-defined condition, the camera 30 executes processing for switching the communication protocol from the mass storage class (MSC) to the PTP.

Details of this processing will be described below.

Figure 7:
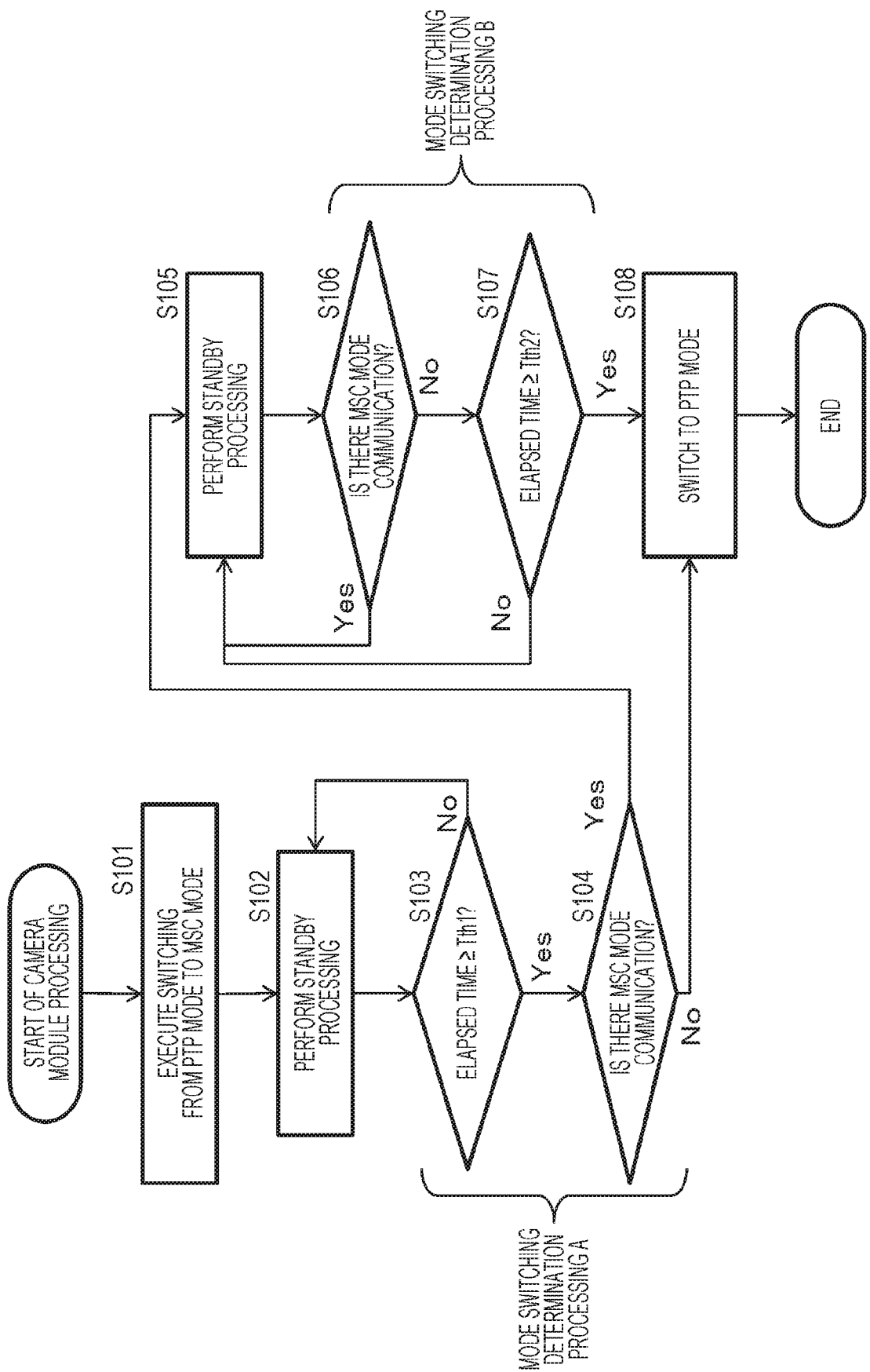
FIG. 7 is a view showing a flowchart for explaining a processing sequence of the camera of the camera-mounted drone.

FIG. 7 is a flowchart for explaining a sequence of processing executed by the camera 30 connected to the drone-main-body control device 20.

The processing of the camera 30 shown in the flowchart is executed under the control of the camera control unit 31 of the camera 30. For example, in accordance with a program stored in the memory 36, the processing is executed under the control of the camera control unit 31 provided with a CPU or the like having a program execution function.

In accordance with the flowchart shown in FIG. 7, processing executed by the camera 30 will be sequentially described.

(Step S101)

In step S101, the camera 30 executes processing for switching communication with the drone-main-body control device 20 from the PTP mode to the MSC mode.

Note that, in the following, a mode of performing communication according to a protocol corresponding to the PTP is referred to as a PTP mode, and a mode of performing communication according to a protocol corresponding to the mass storage class (MSC) is referred to as an MSC mode.

The PTP mode corresponds to the image capture mode of outputting various imaging control commands such as imaging execution, imaging stop, and focus and zoom settings from the drone-main-body control device 20 to the camera 30, by communication according to the PTP protocol.

Whereas, the MSC mode corresponds to the image transfer mode in which the drone-main-body control device 20 can access, read, and acquire a captured image stored in the storage unit 35 of the camera 30.

Step S101 is a process of once ending the image capturing by the camera 30 that has been executed in the PTP mode (image capture mode), and changing the PTP mode (image capture mode) to the MSC mode (image transfer mode), to change to a mode in which the drone-main-body control device 20 can read out a captured image of the camera 30 to the drone-main-body control device 20 side at a high speed, in accordance with the protocol corresponding to the mass storage class (MSC).

Note that, as described above, the process of changing the PTP mode (image capture mode) to the MSC mode (image transfer mode) can be executed, for example, by outputting a mode switching command according to the PTP protocol from the drone-main-body control device 20 to the camera 30.

(Step S102)

After execution of switching from the PTP mode to the MSC mode in step S101, next, the camera 30 stands by for a predetermined time in step 102.

This standby processing is a process of standing by for the transfer processing on a captured image from the camera 30 to the drone-main-body control device 20, which is assumed to be performed in the MSC mode (image transfer mode).

In many cases, after changing from the PTP mode (image capture mode) to the MSC mode (image transfer mode), the drone-main-body control device 20 accesses the storage unit 35 of the camera 30 and executes processing of acquiring a captured image stored in the storage unit 35.

In step S102, standby is performed for start and execution of this processing.

(Step S103)

Next, after changing from the PTP mode (image capture mode) to the MSC mode (image transfer mode), the camera 30 determines whether or not a pre-defined threshold time (Tth1) or longer has been reached.

In a case where a standby time (t) is not equal to or longer than the pre-defined threshold time (Tth1), the process returns to step S102 to continue the standby processing.

Whereas, in a case where the standby time (t) has become equal to or longer than the pre-defined threshold time (Tth1), the process proceeds to step S104.

(Step S104)

In standby time determination processing in step S103, in a case where the standby time (t) has become equal to or longer than the pre-defined threshold time (Tth1), the process proceeds to step S104.

In step S104, the camera 30 determines whether or not communication in the MSC mode (image transfer mode) has occurred, in other words, communication in the MSC mode (image transfer mode) has occurred between the camera 30 and the drone-main-body control device 20.

In a case where communication in the MSC mode (image transfer mode) has occurred, the process proceeds to step S105.

This means that transfer processing on a captured image from the camera 30 to the drone-main-body control device 20 is executed in the MSC mode (image transfer mode) within the pre-defined threshold time (Tth1).

Whereas, in a case where it is determined that communication in the MSC mode (image transfer mode) has not occurred, the process proceeds to step S108.

This means that transfer processing on a captured image from the camera 30 to the drone-main-body control device 20 has not been executed in the MSC mode (image transfer mode) within the pre-defined threshold time (Tth1).

The determination processing in steps S103 and S104 described above is to be referred to as mode switching determination processing A.

A correspondence between a determination form of this mode determination processing A and processing based on a determination result will be described with reference to FIG. 8.

FIG. 8 is a table summarizing processing to be executed in accordance with determination results of the following steps S103 and S104.

Determination processing in step S103=whether or not an elapsed time (t) after switching from the PTP mode (image capture mode) to the MSC mode (image transfer mode) has become equal to or longer than the threshold Tth1, Determination processing in step S104=presence or absence of communication in the MSC mode (image transfer mode) (presence or absence of image transfer processing), (a1) The processing in a case where the determination processing in step S103 is No, in other words, in a case where the elapsed time (t) after switching from the PTP mode (image capture mode) to the MSC mode (image transfer mode) has not become equal to or longer than the threshold Tth1, is to be the following processing.

It is determined as waiting for image transfer start in the MSC mode (image transfer mode), and the MSC mode is continued.

Whereas, in the processing in a case where the determination processing in step S103 is Yes, in other words, in a case where the elapsed time (t) after switching from the PTP mode (image capture mode) to the MSC mode (image transfer mode) has become equal to or longer than the threshold Tth1, different processing is executed as follows in accordance with the determination result of step S104.

(a2) In a case where the determination processing in step S104 is Yes, in other words, in a case where there has been communication in the MSC mode (image transfer mode) within the threshold time (Tth1) after switching from the PTP mode (image capture mode) to the MSC mode (image transfer mode), the following processing is executed.

It is determined that image transfer processing in the MSC mode (image transfer mode) is being executed, the MSC mode is continued, and the process proceeds to step S105 to execute next mode switching determination processing B.

(a3) Whereas, in a case where the determination processing in step S104 is No, in other words, in a case where there has been no communication in the MSC mode (image transfer mode) while the elapsed time (t) after switching from the PTP mode (image capture mode) to the MSC mode (image transfer mode) is within the threshold time (Tth1), the following processing is executed.

It is determined that the image transfer processing in the MSC mode (image transfer mode) is not executed, and the process proceeds to step S108 to execute mode switching processing from the MSC mode (image transfer mode) to the PTP mode (image capture mode).

Returning to the flow shown in FIG. 7, processing from step S105 will be described.

(Step S105)

As described above, in a case where the determination processing in step S104 is Yes, in other words, in a case where there has been communication in the MSC mode (image transfer mode) within the threshold time (Tth1) after switching from the PTP mode (image capture mode) to the MSC mode (image transfer mode), it is determined that image transfer processing in the MSC mode (image transfer mode) is being executed, the MSC mode is continued, and the process proceeds to step S105.

In step S105, the MSC mode is continued and standby is further performed.

(Step S106)

The processing in steps S106 and S107 is the mode switching determination processing B.

First, in step S106, the camera 30 checks the presence or absence of occurrence of communication in the MSC mode (image transfer mode). In other words, it is determined whether or not communication in the MSC mode (image transfer mode) has occurred between the camera 30 and the drone-main-body control device 20.

In a case where communication in the MSC mode (image transfer mode) has occurred, the process returns to step S105 to continue the MSC mode (image transfer mode) and stand by.

This means that transfer processing on a captured image from the camera 30 to the drone-main-body control device 20 is executed in the MSC mode (image transfer mode).

Whereas, in a case where it is determined that communication in the MSC mode (image transfer mode) has not occurred, the process proceeds to step S107.

This means that transfer processing on a captured image from the camera 30 to the drone-main-body control device 20 has not been executed in the MSC mode (image transfer mode), in other words, has been ended or interrupted.

(Step S107)

Next, in step S107, the camera 30 determines whether or not a pre-defined threshold time (Tth2) or longer has reached since the most recent communication in the MSC mode (image transfer mode).

In a case where the standby time (t) is not equal to or longer than the pre-defined threshold time (Tth2), the process returns to step S105 to continue the MSC mode (image transfer mode) and stand by.

Whereas, in a case where the standby time (t) has become equal to or longer than the pre-defined threshold time (Tth2), the process proceeds to step S108 to execute mode switching processing from the MSC mode (image transfer mode) to the PTP mode (image capture mode).

This is mode switching processing based on the determination that the image transfer processing in the MSC mode (image transfer mode) has been ended.

The determination processing in steps S106 and S107 described above is to be referred to as the mode switching determination processing B.

A correspondence between a determination form of this mode determination processing B and processing based on a determination result will be described with reference to FIG. 9.

FIG. 9 is a table summarizing processing to be executed in accordance with determination results of the following steps S106 and S107.

Determination processing in step S106=presence or absence of communication in the MSC mode (image transfer mode) (presence or absence of image transfer processing), Determination processing in step S107=whether or not the elapsed time (t) from the most recent communication in the MSC mode (image transfer mode) has become equal to or longer than the threshold Tth2, (b1) in a case where the determination processing in step S106 is Yes, in other words, in a case where communication in the MSC mode (image transfer mode) is detected, the following process is executed.

It is determined that image transfer in the MSC mode (image transfer mode) is being executed, and the process returns to step S105 to continue the MSC mode and stand by.

Whereas, in a case where the determination processing in step S106 is No, in other words, in a case where no communication in the MSC mode (image transfer mode) has been detected, different processing is executed as follows in accordance with the determination result of step S107.

(b2) In a case where the determination process in step S107 is No, in other words, in a case where it is determined that the elapsed time (t) from the most recent communication in the MSC mode (image transfer mode) has not become equal to or longer than the threshold Tth2, the following processing is executed.

It is determined that image transfer in the MSC mode (image transfer mode) is being executed, and the process returns to step S105 to continue the MSC mode and stand by.

(b3) Whereas, in a case where the determination processing in step S107 is Yes, in other words, in a case where it is determined that the elapsed time (t) from the most recent communication in the MSC mode (image transfer mode) has become equal to or longer than the threshold Tth2, the following processing is executed.

It is determined that the image transfer processing in the MSC mode (image transfer mode) is ended, and the process proceeds to step S108 to execute mode switching processing from the MSC mode (image transfer mode) to the PTP mode (image capture mode).

Returning to the flow shown in FIG. 7, processing in step S108 will be described.

(Step S108)

In a case where the determination result in step S104 is NO or the determination result in step S107 is No, the process proceeds to step S108.

These are the following cases.

A case of (a3) described with reference to FIG. 8, in other words, a case where there is no communication in the MSC mode (image transfer mode) while the elapsed time (t) after switching from the PTP mode (image capture mode) to the MSC mode (image transfer mode) is within the threshold time (Tth1), and it is determined that the image transfer processing in the MSC mode (image transfer mode) is not executed.

Moreover, a case of (b3) described with reference to FIG. 9, in other words, a case where the elapsed time (t) from the most recent communication in the MSC mode (image transfer mode) has become equal to or longer than the threshold Tth2, and it is determined that the image transfer processing in the MSC mode (image transfer mode) is ended.

In these cases, the process proceeds to step S108 to execute mode switching processing from the MSC mode (image transfer mode) to the PTP mode (image capture mode).

A specific sequence example of the mode switching processing from the MSC mode (image transfer mode) to the PTP mode (image capture mode) will be described with reference to a flowchart shown in FIG. 10.

Figure 10:
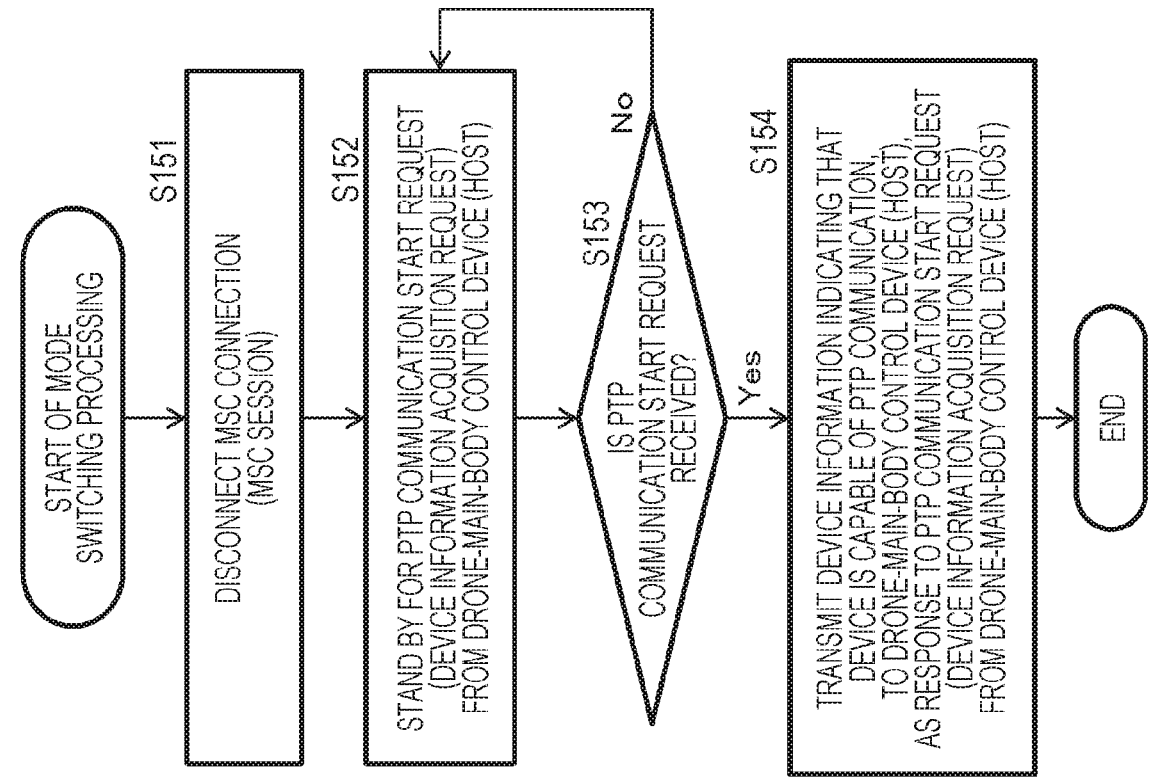
FIG. 10 is a view showing a flowchart for explaining a processing sequence of the camera of the camera-mounted drone.

The flowchart shown in FIG. 10 is a flowchart showing a detailed example of processing in step S108, which is the final step of the flow shown in FIG. 7.

Processing of each step in the flow shown in FIG. 10 will be described.

(Step S151)

In a case where the camera 30 determines that a switching condition from the MSC mode (image transfer mode), which is the current camera setting mode, to the PTP mode (image capture mode) has occurred, the MSC connection (MSC session) with the drone-main-body control device 20 is disconnected in step S151.

(Step S152)

Next, in step S152, the camera 30 stands by for input of a PTP communication start request (device information acquisition request) from the drone-main-body control device 20, which is a host device.

When the drone-main-body control device 20 detects that the MSC connection has been disconnected, a new device detection processing is executed for a USB-connected device, in other words, the camera 30.

(Step S153)

In step S153, the camera 30 determines whether or not a PTP communication start request (device information acquisition request) has been received from the drone-main-body control device 20. In a case of being not received, the standby processing in step S152 is continued.

Whereas, in a case where it is determined that a PTP communication start request (device information acquisition request) from the drone-main-body control device 20 has been received, the process proceeds to step S154.

(Step S154)

In step S154, the camera 30 returns device information indicating that the device is capable of the PTP communication, to the drone-main-body control device 20 as a response to the PTP communication start request (device information acquisition request) from the drone-main-body control device 20.

Upon receiving this response, the drone-main-body control device 20 recognizes the camera 30 as a device capable of the PTP communication, and executes subsequent communication in accordance with the PTP communication protocol.

After this mode switching, the drone-main-body control device 20 can output, to the camera 30, a command for starting, ending, and the like of image capturing, and various imaging control commands such as focus setting and zoom setting, to perform imaging processing in accordance with the PTP protocol.

[4. About Processing Example for Detecting Movement Indicating Start of Imaging to Execute Mode Switching]

The processing described with reference to FIG. 7 has been a processing example in which the communication processing executed between the camera 30 and the drone-main-body control device 20 is monitored, and the mode switching processing from the MSC mode (image transfer mode) to the PTP mode (image capture mode) is executed in accordance with a communication processing status.

Next, a processing example will be described in which the camera 30 detects a movement of the camera itself, in other words, a movement of the camera-mounted drone 10, and executes mode switching processing from the MSC mode (image transfer mode) to the PTP mode (image capture mode) in a case where the movement is a specific movement indicating start of image capturing.

A processing sequence of this processing example will be described with reference to a flowchart shown in FIG. 11.

Figure 11:
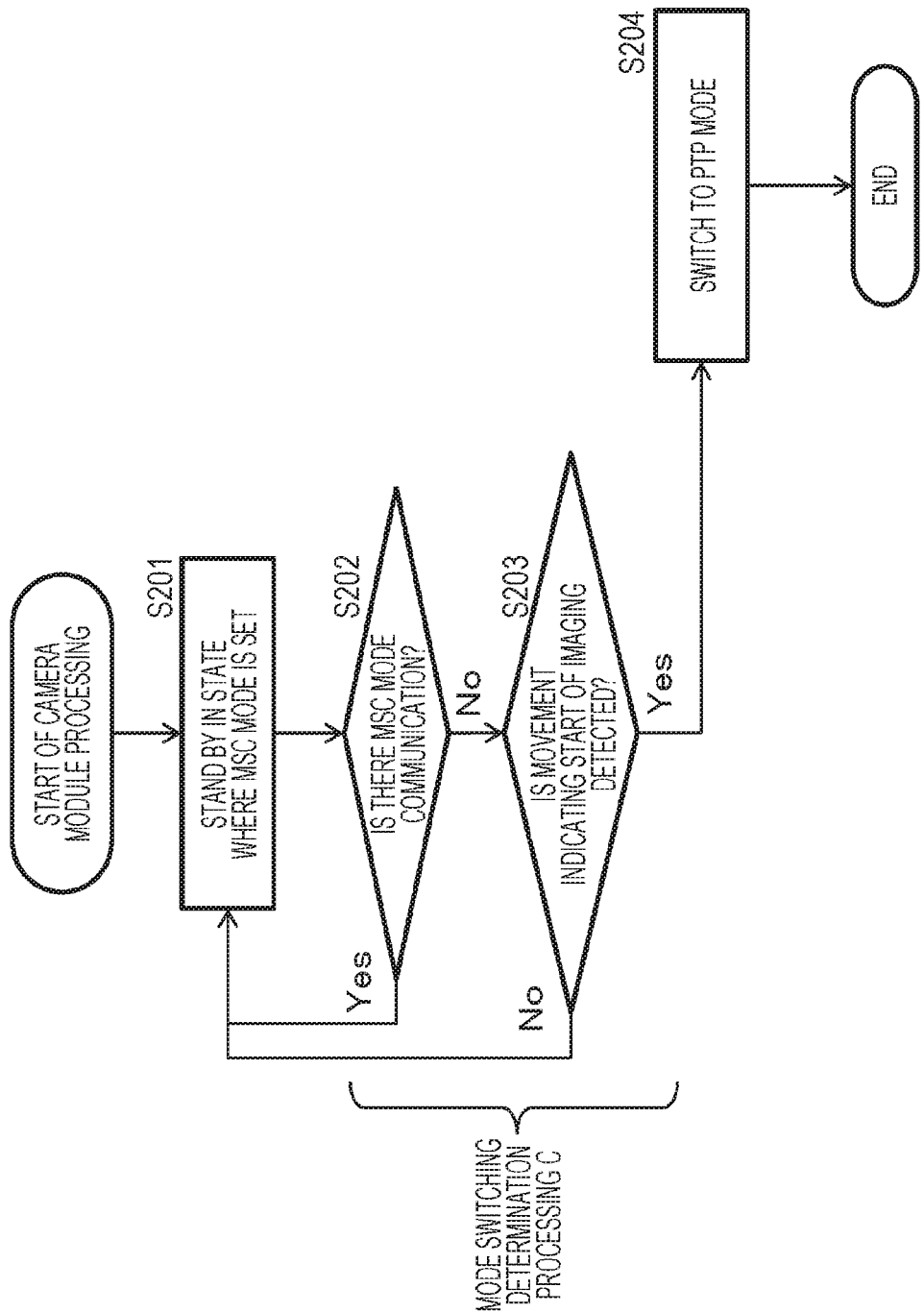
FIG. 11 is a view showing a flowchart for explaining a processing sequence of the camera of the camera-mounted drone.

FIG. 11 is a flowchart for explaining a sequence of processing executed by the camera 30 connected to the drone-main-body control device 20, similarly to the flow described with reference to FIG. 7.

The processing of the camera 30 shown in the flowchart is executed under the control of the camera control unit 31 of the camera 30. For example, in accordance with a program stored in the memory 36, the processing is executed under the control of the camera control unit 31 provided with a CPU or the like having a program execution function.

In accordance with the flowchart shown in FIG. 11, processing executed by the camera 30 will be sequentially described.

(Step S201)

In step S201, the camera 30 stands by in a state where the MSC mode (image transfer mode) is set, which is for executing communication with the drone-main-body control device 20 as the communication according to the MSC protocol.

Note that, in this MSC mode (image transfer mode) set state, the drone-main-body control device 20 can acquire a captured image stored in the storage unit 35 of the camera 30 at a high speed.

(Step S202)

Next, in step S202, the camera 30 verifies whether or not communication with the drone-main-body control device 20 has occurred in the MSC mode (image transfer mode) set state.

In a case where it is determined that communication with the drone-main-body control device 20 has occurred, the process returns to step S201 to continue the MSC mode (image transfer mode) setting and stand by.

This means that the drone-main-body control device 20 is executing access to a captured image stored in the storage unit 35 of the camera 30.

Whereas, in a case where it is determined that there is no communication with the drone-main-body control device 20, the process proceeds to step S203.

This means that the drone-main-body control device 20 is not executing access to a captured image stored in the storage unit 35 of the camera 30.

(Step S203)

In a case where the camera 30 determines in step S202 that there is no MSC mode (image transfer mode) communication with the drone-main-body control device 20, the process proceeds to step S203.

In step S203, the camera 30 performs a movement determination as to whether or not there is a pre-defined movement peculiar to start of image capturing.

For example, a movement of the camera 30 (=camera-mounted drone 10) is determined with use of detection information of a gyroscope or the like included in the sensor 25 mounted on the camera 30.

In a case where a pre-defined movement peculiar to start of image capturing is not detected, the process returns to step S201 to continue the MSC mode (image transfer mode) setting and stand by.

Whereas, in a case where it is determined that there is a pre-defined movement peculiar to start of image capturing, the process proceeds to step S204.

(Step S204)

In a case where it is determined in step S203 that there is a pre-defined movement peculiar to start of image capturing, the process proceeds to step S204.

In step S204, the camera 30 executes mode switching processing from the MSC mode (image transfer mode) to the PTP mode (image capture mode).

This mode switching processing is executed as a processing according to the flow described above with reference to FIG. 10.

A feature of the present embodiment is that, in step S203, the movement determination is performed as to whether or not there is a pre-defined movement peculiar to start of image capturing, and in a case where it is determined that there has been a movement peculiar to start of image capturing as a result of this determination, mode switching processing from the MSC mode (image transfer mode) to the PTP mode (image capture mode) is executed.

In this embodiment, the camera control unit 31 of the camera 30 monitors a flight state of the camera 30 (=camera-mounted drone 10).

In a case where the camera control unit 31 determines that the flight state is a characteristic movement indicating start of imaging, the mode switching from the MSC mode (image transfer mode) to the PTP mode (image capture mode) is executed.

This mode switching enables the drone-main-body control device 20 to output an imaging start command or the like to the camera 30 in accordance with the PTP protocol, and to start imaging immediately.

An example of the movement used in the determination processing in step S203, in other words, in the movement determination as to whether or not there has been a movement peculiar to start of image capturing will be described with reference to FIG. 12.

FIG. 12 shows the following two examples as an example of a pre-defined movement peculiar to start of image capturing.

(1) Turning (2) Repeated ascent and descent at a fixed position

As shown in FIG. 12, turning is a movement that is often executed when an imaging direction is changed, and it is determined as start of imaging, to switch to the PTP mode (image capture mode).

Furthermore, as shown in FIG. 12, a movement of only ascent or descent is determined as a middle of movement, while repeated ascent and descent at a fixed position is determined as start of imaging, to switch to the PTP mode (image capture mode).

In the memory 36 of the camera 30, for example, gyroscope output pattern information to be determined as these movements, in other words, (1) turning and (2) repeated ascent and descent at a fixed position, is registered in advance.

The camera control unit 31 of the camera 30 compares the gyroscope output information and registration information registered in the memory 36, and determines that the movement is peculiar to start of image capturing in a case where it is determined that that they are similar. In other words, Yes is determined as the determination result in step S203, and the process proceeds to step S204 to switch the MSC mode (image transfer mode) to the PTP mode (image capture mode).

This switching processing enables the drone-main-body control device 20 to start imaging by outputting an imaging start command or the like to the camera 30 by communication processing according to the PTP protocol.

Note that the example of movement shown in FIG. 11 is an example, and it becomes possible to perform mode switching according to various movements in addition to this, by storing sensor detection patterns corresponding to various movements peculiar to start of imaging, in the memory 36 of the camera 30.

The determination processing in steps S202 and S203 in the flow shown in FIG. 11 is to be referred to as mode switching determination processing C.

A correspondence between a determination form of this mode determination processing C and processing based on a determination result will be described with reference to FIG. 13.

FIG. 13 is a table summarizing processing to be executed in accordance with determination results of the following steps S202 and S203 shown in FIG. 11.

Determination processing in step S202=presence or absence of communication in the MSC mode (image transfer mode) (presence or absence of image transfer processing), Determination processing in step S203=whether or not a movement indicating start of imaging has been detected, (c1) in a case where the determination processing in step S202 is Yes, in other words, in a case where communication in the MSC mode (image transfer mode) has been detected, the following process is executed.

It is determined that image transfer in the MSC mode (image transfer mode) is being executed, and the process returns to step S201 to continue the MSC mode and stand by.

Whereas, in a case where the determination processing in step S202 is No, in other words, in a case where no communication in the MSC mode (image transfer mode) has been detected, different processing is executed as follows in accordance with the determination result of step S203.

(c2) In a case where the determination processing in step S203 is Yes, in other words, in a case where it is determined that a movement indicating start of imaging has been detected, the following process is executed.

It is determined that imaging processing is to be started, and the process proceeds to step S204 to execute mode switching processing from the MSC mode (image transfer mode) to the PTP mode (image capture mode).

(b3) Whereas, in a case where the determination processing in step S203 is No, in other words, in a case where a movement indicating start of imaging has not been detected, the following process is executed.

It is determined that imaging processing is not to be started, and the process returns to step S201 to continue the MSC mode (image transfer mode) and stand by.

Note that this processing example, in other words, processing according to the flow shown in FIG. 11 may be set to be executed at a timing different from the processing flow described above with reference to FIG. 7, or may be set to be executed together in parallel at the same timing.

Furthermore, for example, the setting may be such that the mode switching determination processing C shown in the flow of FIG. 11 is performed between the mode switching determination processing A and the mode determination processing B shown in the flow of FIG. 7.

Note that, in any case of FIG. 7 and FIG. 11, the mode switching processing from the MSC mode (image transfer mode) to the PTP mode (image capture mode) is executed after confirming that communication between the camera 30 and the drone-main-body control device 20 has not occurred.

[5. Summary of Configuration of Present Disclosure]

The embodiments of the present disclosure have been described in detail with reference to the specific embodiments. However, it is obvious that those skilled in the art can make modifications and substitutions of the embodiment without departing from the scope of the present disclosure. In other words, the present invention has been disclosed in the form of exemplification, and should not be construed as limiting. In order to determine the scope of the present disclosure, the section of the claims should be taken into consideration.

Note that the technology disclosed in the present specification can have the following configurations.

(1) An imaging device having a control unit configured to execute switching processing on a communication mode between a PTP mode, which is a communication mode according to a picture transfer protocol (PTP), and an MSC mode, which is a communication mode according to a mass storage class (MSC), in which the control unit verifies a communication status in the MSC mode, and executes switching processing from the MSC mode to the PTP mode in a case where it is determined that a pre-defined mode switching condition is satisfied.

(2) The imaging device according to (1), in which the mode switching condition is a communication status confirmation that communication processing by the MSC mode has not been executed for a specified time (Tth1) or longer after switching from the PTP mode to the MSC mode, and the control unit executes switching processing from the MSC mode to the PTP mode in a case where the communication status confirmation is performed.

(3) The imaging device according to (1), in which the mode switching condition is a communication status confirmation that communication processing by the MSC mode has not been executed for a specified time (Tth2) or longer after most recent communication in the MSC mode, and the control unit executes switching processing from the MSC mode to the PTP mode in a case where the communication status confirmation is performed.

(4) The imaging device according to (1), in which the mode switching condition is a movement confirmation that a pre-defined movement indicating start of image capturing has been detected, and the control unit executes switching processing from the MSC mode to the PTP mode in a case where the movement confirmation is performed.

(5) The imaging device according to (4), in which the control unit executes the movement confirmation by inputting gyroscope detection information of the imaging device.

(6) The imaging device according to any one of (1) to (5), in which the PTP mode is an image capture mode for executing image capturing by inputting an imaging control signal according to a PTP protocol, from a host device connected with the imaging device, and the MSC mode is an image transfer mode in which the host device accesses a storage unit of the imaging device to acquire a captured image.

(7) The imaging device according to any one of (1) to (6), in which
the imaging device is
a component of a camera-mounted drone, and
the control unit
executes processing for switching communication with a drone-main-body control device from the PTP mode to the MSC mode.

(8) The imaging device according to (7), in which
the imaging device
inputs an imaging control command from the drone-main-body control device, to execute image capturing in the PTP mode, and
executes transfer processing on a captured image to the drone-main-body control device in the MSC mode.

(9) The imaging device according to any one of (1) to (8), in which
the control unit,
in a case where it is detected that the mode switching condition is satisfied,
stops MSC mode communication with a host device connected via a communication unit, and
performs response transmission of device information indicating that a device is capable of PTP communication in response to reception of a device information acquisition request accompanying PTP connection from the host device.

(10) A camera-mounted drone including:
a drone-main-body control device configured to execute flight control of a drone and imaging control for a camera connected via a communication unit; and
a camera configured to execute image capturing in response to an input command from the drone-main-body control device, in which
the camera
has a camera control unit configured to execute switching processing on a communication mode between a PTP mode, which is a communication mode according to a picture transfer protocol (PTP), and an MSC mode, which is a communication mode according to a mass storage class (MSC), and
the camera control unit
verifies a communication status in the MSC mode, and
executes switching processing from the MSC mode to the PTP mode in a case where it is determined that a pre-defined mode switching condition is satisfied.

(11) The camera-mounted drone according to (10), in which
the mode switching condition is
a communication status confirmation that communication processing by the MSC mode has not been executed for a specified time (Tth1) or longer after switching from the PTP mode to the MSC mode, and
the camera control unit
executes switching processing from the MSC mode to the PTP mode in a case where the communication status confirmation is performed.

(12) The camera-mounted drone according to (10), in which
the mode switching condition is
a communication status confirmation that communication processing by the MSC mode has not been executed for a specified time (Tth2) or longer after most recent communication in the MSC mode, and
the camera control unit
executes switching processing from the MSC mode to the PTP mode in a case where the communication status confirmation is performed.

(13) The camera-mounted drone according to (10), in which
the mode switching condition is
a movement confirmation that a pre-defined movement indicating start of image capturing has been detected, and
the camera control unit
executes switching processing from the MSC mode to the PTP mode in a case where the movement confirmation is performed.

(14) A mode control method to be executed in an imaging device, in which
the imaging device
has a control unit configured to execute switching processing on a communication mode between a PTP mode, which is a communication mode according to a picture transfer protocol (PTP), and an MSC mode, which is a communication mode according to a mass storage class (MSC), and
the control unit
verifies a communication status in the MSC mode, and
executes switching processing from the MSC mode to the PTP mode in a case where it is determined that a pre-defined mode switching condition is satisfied.

(15) A mode control method to be executed in a camera-mounted drone, in which
the camera-mounted drone has:
a drone-main-body control device configured to execute flight control of a drone and imaging control for a camera connected via a communication unit; and
a camera configured to execute image capturing in response to an input command from the drone-main-body control device, and
the camera
verifies a communication status in an MSC mode, and
executes switching processing from the MSC mode to a PTP mode in a case where it is determined that a pre-defined mode switching condition is satisfied.

(16) A program for executing mode control processing in an imaging device, in which
the imaging device
has a control unit configured to execute switching processing on a communication mode between a PTP mode, which is a communication mode according to a picture transfer protocol (PTP), and an MSC mode, which is a communication mode according to a mass storage class (MSC), and
the program causes the control unit to execute
processing for verifying a communication status in the MSC mode, and
switching processing from the MSC mode to the PTP mode in a case where it is determined that a pre-defined mode switching condition is satisfied.

Furthermore, the series of processing described in the specification can be executed by hardware, software, or a combined configuration of both. In a case of executing processing by software, a program recording a processing sequence can be installed and executed in a memory in a computer incorporated in dedicated hardware, or a program can be installed and executed in a general-purpose computer capable of executing various types of processing. For example, the program can be recorded in advance on a recording medium. The program can be installed from a recording medium to a computer, or can be received via a network such as a local area network (LAN) or the Internet, and installed in a recording medium such as an incorporated hard disk.

Note that the various types of processing described in the specification may be executed not only in a chronological order in accordance with the description, but may also be executed in parallel or individually depending on processing capability of a device that executes the processing or depending on the necessity. Furthermore, a system in this specification is a logical set configuration of a plurality of devices, and is not limited to one in which a device of each configuration is in a same casing.

INDUSTRIAL APPLICABILITY

As described above, according to a configuration of an embodiment of the present disclosure, there is realized an imaging device that monitors a communication status or the like, and executes switching processing from the MSC mode to the PTP mode in a case where a pre-defined condition is satisfied.

Specifically, there is provided a control unit configured to execute switching processing between for example, a PTP communication mode applied with the PTP protocol, and an MSC mode, which is a communication mode according to a mass storage class (MSC). For example, in a case where MSC mode communication processing has not been executed for a specified time or more, a case where a movement indicating start of image capturing is detected, or the like, the control unit executes switching processing from the MSC mode to the PTP mode. After switching to the PTP mode, it is possible to execute imaging by inputting an image capturing control command from a host device.

This configuration realizes an imaging device that monitors a communication status or the like and executes switching processing from the MSC mode to the PTP mode in a case where a pre-defined condition is satisfied.

REFERENCE SIGNS LIST

10 Camera-mounted drone
20 Drone-main-body control device
21 Main-body control unit
22 Flight control unit
23 Camera communication unit
24 External device communication unit
25 Sensor
26 Memory
27 Clocking unit
28 Power supply unit
30 Camera
31 Camera control unit
32 Lens unit
33 Image sensor
34 Image processing unit
35 Storage unit
36 Memory
37 Clocking unit
38 Communication unit

The invention claimed is:
1. An imaging device comprising:
a control unit configured to execute switching processing on a communication mode between a picture transfer protocol (PTP) mode that is a first communication mode according to a PTP, and a mass storage class (MSC) mode that is a second communication mode according to an MSC, wherein
the control unit
verifies a communication status in the MSC mode, and
executes switching processing from the MSC mode to the PTP mode in a case where it is determined that a mode switching condition that is pre-defined is satisfied,
wherein
the mode switching condition is a movement confirmation that a pre-defined movement indicating start of image capturing has been detected, and
the control unit executes switching processing from the MSC mode to the PTP mode in a case where the movement of the imaging device confirmation is performed.
2. The imaging device according to claim 1, wherein
the mode switching condition is a communication status confirmation that communication processing by the MSC mode has not been executed for a specified time (Tth1) or longer after switching from the PTP mode to the MSC mode, and
the control unit executes switching processing from the MSC mode to the PTP mode in a case where the communication status confirmation is performed.
3. The imaging device according to claim 1, wherein
the mode switching condition is a communication status confirmation that communication processing by the MSC mode has not been executed for a specified time (Tth2) or longer after most recent communication in the MSC mode, and
the control unit executes switching processing from the MSC mode to the PTP mode in a case where the communication status confirmation is performed.
4. The imaging device according to claim 1, wherein
the control unit executes the movement confirmation by inputting gyroscope detection information of the imaging device.
5. The imaging device according to claim 1, wherein the PTP mode is an image capture mode for executing image capturing by inputting an imaging control signal according to a PTP protocol, from a host device connected with the imaging device, and
the MSC mode is an image transfer mode in which the host device accesses a storage unit of the imaging device to acquire a captured image.
6. The imaging device according to claim 1, wherein
the imaging device is a component of a camera-mounted drone, and
the control unit executes processing for switching communication with a drone-main-body control device from the PTP mode to the MSC mode.
7. The imaging device according to claim 6, wherein
the imaging device inputs an imaging control command from the drone-main-body control device, to execute image capturing in the PTP mode, and
executes transfer processing on a captured image to the drone-main-body control device in the MSC mode.
8. The imaging device according to claim 1, wherein
the control unit, in a case where it is detected that the mode switching condition is satisfied, stops MSC mode communication with a host device connected via a communication unit, and
performs response transmission of device information indicating that a device is capable of PTP communication in response to reception of a device information acquisition request accompanying PTP connection from the host device.
9. A camera-mounted drone comprising:
a drone-main-body control device configured to execute flight control of a drone and imaging control for a camera connected via a communication unit; and a camera configured to execute image capturing in response to an input command from the drone-main-body control device, wherein the camera has a camera control unit configured to execute switching processing on a communication mode between a PTP mode that is a first communication mode according to a picture transfer protocol (PTP), and an MSC mode that is a second communication mode according to a mass storage class (MSC), and the camera control unit verifies a communication status in the MSC mode, and executes switching processing from the MSC mode to the PTP mode in a case where it is determined that a mode switching condition that is pre-defined is satisfied, wherein the mode switching condition is a movement confirmation that a pre-defined movement of the camera indicating start of image capturing has been detected, and the camera control unit executes switching processing from the MSC mode to the PTP mode in a case where the movement confirmation is performed.

10. The camera-mounted drone according to claim 9, wherein the mode switching condition is a communication status confirmation that communication processing by the MSC mode has not been executed for a specified time (Tth1) or longer after switching from the PTP mode to the MSC mode, and the camera control unit executes switching processing from the MSC mode to the PTP mode in a case where the communication status confirmation is performed.

11. The camera-mounted drone according to claim 9, wherein the mode switching condition is a communication status confirmation that communication processing by the MSC mode has not been executed for a specified time (Tth2) or longer after most recent communication in the MSC mode, and the camera control unit executes switching processing from the MSC mode to the PTP mode in a case where the communication status confirmation is performed.

12. The camera-mounted drone according to claim 9, wherein the drone-main-body control device executes the movement confirmation by inputting gyroscope detection information of the camera.

13. The camera-mounted drone according to claim 9, wherein the PTP mode is an image capture mode for executing image capturing by inputting an imaging control signal according to a PTP protocol, from a host device connected with the camera, and the MSC mode is an image transfer mode in which the host device accesses a storage unit of the camera to acquire a captured image.

14. A mode control method to be executed in an imaging device, the method comprising:

verifying, with a control unit, a communication status in a mass storage class (MSC) mode; and executing, with the control unit, switching processing from the MSC mode to a picture transfer protocol (PTP) mode in a case where it is determined that a pre-defined mode switching condition is satisfied, wherein the pre-defined mode switching condition is a movement confirmation that a pre-defined movement of the imaging device indicating start of image capturing has been detected, and the control unit executes switching processing from the MSC mode to the PTP mode in a case where the movement confirmation is performed.

15. The mode control method according to claim 14, wherein the pre-defined mode switching condition is a communication status confirmation that communication processing by the MSC mode has not been executed for a specified time (Tth1) or longer after switching from the PTP mode to the MSC mode, and the control unit executes switching processing from the MSC mode to the PTP mode in a case where the communication status confirmation is performed.

16. The mode control method according to claim 14, wherein the pre-defined mode switching condition is a communication status confirmation that communication processing by the MSC mode has not been executed for a specified time (Tth2) or longer after most recent communication in the MSC mode, and the control unit executes switching processing from the MSC mode to the PTP mode in a case where the communication status confirmation is performed.

17. A mode control method to be executed in a camera-mounted drone, the method comprising:

executing, with a drone-main-body control device, flight control of a drone and imaging control for a camera connected via a communication unit; and executing, with the drone-main-body control device, image capturing in response the camera, wherein the camera verifies a communication status in a mass storage class (MSC) mode, executes switching processing from the MSC mode to a picture transfer protocol (PTP) mode in a case where it is determined that a pre-defined mode switching condition is satisfied, the pre-defined mode switching condition is a movement confirmation that a pre-defined movement of the camera indicating start of image capturing has been detected, and the camera executes switching processing from the MSC mode to the PTP mode in a case where the movement confirmation is performed.

18. The mode control method according to claim 17, wherein the pre-defined mode switching condition is a communication status confirmation that communication processing by the MSC mode has not been executed for a specified time (Tth1) or longer after switching from the PTP mode to the MSC mode, and the drone-main-body control device executes switching processing from the MSC mode to the PTP mode in a case where the communication status confirmation is performed.

19. The mode control method according to claim 17, wherein the pre-defined mode switching condition is a communication status confirmation that communication processing by the MSC mode has not been executed for a specified time (Tth2) or longer after most recent communication in the MSC mode, and the drone-main-body control device executes switching processing from the MSC mode to the PTP mode in a case where the communication status confirmation is performed.

20. A non-transitory computer-readable medium comprising a program that, when executed by an electronic processor, causes the electronic processor to perform a set of operations comprising:

verifying a communication status in a mass storage class (MSC) mode; and switching processing from the MSC mode to a picture transfer protocol (PTP) mode in a case where it is determined that a pre-defined mode switching condition is satisfied, wherein the pre-defined mode switching condition is movement confirmation that a pre-defined movement of an imaging device indicating start of image capturing has been detected, and the electronic processor executes switching processing from the MSC mode to the PTP mode in a case where the movement confirmation is performed.

* * * * *